US010452622B2

(12) United States Patent
Hu et al.

(10) Patent No.: US 10,452,622 B2
(45) Date of Patent: Oct. 22, 2019

(54) AUTOMATICALLY GENERATING A SEMANTIC MAPPING FOR A RELATIONAL DATABASE

(71) Applicant: INTERNATIONAL BUSINESS MACHINES CORPORATION, Armonk, NY (US)

(72) Inventors: Gang Hu, Beijing (CN); Jing Mei, Beijing (CN); Wei Jia Shen, Beijing (CN); Wen B. Sun, Beijing (CN); Guo Tong Xie, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 300 days.

(21) Appl. No.: 14/718,174

(22) Filed: May 21, 2015

(65) Prior Publication Data
US 2015/0347621 A1    Dec. 3, 2015

(30) Foreign Application Priority Data
May 30, 2014    (CN) .......................... 2014 1 0241219

(51) Int. Cl.
G06F 16/901 (2019.01)
G06F 16/21 (2019.01)
(Continued)

(52) U.S. Cl.
CPC .......... *G06F 16/211* (2019.01); *G06F 16/284* (2019.01); *G06F 16/86* (2019.01); *G06F 16/9024* (2019.01)

(58) Field of Classification Search
CPC ......... G06F 17/30292; G06F 17/30917; G06F 17/30958; G06F 17/30595; G06F 17/3043;
(Continued)

(56) References Cited

U.S. PATENT DOCUMENTS 6,490,717 B1 * 12/2002 Pedersen ............ G01R 31/3177
714/E11.118
7,899,796 B1 * 3/2011 Borthwick ........ G06F 17/30489
707/692
(Continued)

FOREIGN PATENT DOCUMENTS

CN    101149748 A    3/2008
CN    101593180 A    12/2009
(Continued)

OTHER PUBLICATIONS

Chris Bizer et al. D2RQ, Jun. 22, 2012, D2RQ.org, Version 0.8.1 released, All pages.*
(Continued)

*Primary Examiner* — Jay A Morrison
*Assistant Examiner* — Antonio J Caiado
(74) *Attorney, Agent, or Firm* — Cantor Colburn LLP; Grant Johnson (57) ABSTRACT

A method for automatically generating a semantic mapping for a relational database RDB includes obtaining a first semantic mapping from a first RDB to an ontology of linked data; obtaining a schema mapping from the first RDB to a second RDB; and generating a second semantic mapping from the second RDB to the ontology of the linked data based on the first semantic mapping and the schema mapping.

3 Claims, 6 Drawing Sheets

(51) Int. Cl.
*G06F 16/84* (2019.01)
*G06F 16/28* (2019.01)

(58) Field of Classification Search
CPC ........... G06F 17/30734; G06F 17/3033; G06F 17/30312; G06F 17/303; G06F 17/30569; G06F 16/211; G06F 16/284; G06F 16/86; G06F 16/9024; G06Q 10/10; G06N 5/04; G06N 5/02
USPC .......... 706/58; 707/780, 763, 791, 793, 795, 707/796, 802, 803, 807, 810, 713
See application file for complete search history.

(56) References Cited

U.S. PATENT DOCUMENTS

| | | | | |
|---|---|---|---|---|
| 8,037,108 | B1* | 10/2011 | Chang | G06F 17/303 707/803 |
| 8,204,903 | B2* | 6/2012 | Bowers | G06F 17/30401 707/713 |
| 8,874,551 | B2* | 10/2014 | Rosjat | G06F 17/30477 707/714 |
| 8,983,993 | B2* | 3/2015 | Senart | G06F 17/30592 707/604 |
| 9,098,566 | B2* | 8/2015 | Srinivasan | G06F 17/30292 |
| 9,569,725 | B2* | 2/2017 | B'Far | G06N 5/022 |
| 2004/0133869 | A1* | 7/2004 | Sharma | G06F 17/5054 716/116 |
| 2006/0015843 | A1* | 1/2006 | Sabbouh | G06F 17/30893 717/106 |
| 2006/0036633 | A1* | 2/2006 | Chong | G06F 17/30734 |
| 2006/0235823 | A1* | 10/2006 | Chong | G06F 17/30557 |
| 2006/0235837 | A1* | 10/2006 | Chong | G06F 17/30448 |
| 2007/0226196 | A1* | 9/2007 | Adya | G06F 17/30457 |
| 2008/0082571 | A1 | 4/2008 | Sakai et al. | |
| 2008/0228697 | A1* | 9/2008 | Adya | G06F 17/30595 |
| 2008/0243770 | A1* | 10/2008 | Aasman | G06F 17/30587 |
| 2008/0243908 | A1* | 10/2008 | Aasman | G06F 17/30241 |
| 2008/0256121 | A1* | 10/2008 | Liu | G06F 17/30592 |
| 2008/0294644 | A1* | 11/2008 | Liu | G06F 17/2785 |
| 2008/0319947 | A1* | 12/2008 | Latzina | G06F 17/2785 |
| 2009/0077094 | A1* | 3/2009 | Bodain | G06F 17/30734 |
| 2009/0106234 | A1* | 4/2009 | Siedlecki | G06F 17/30864 |
| 2009/0132474 | A1* | 5/2009 | Ma | G06F 17/30451 |
| 2009/0240714 | A1* | 9/2009 | Keith | G06F 17/2785 |
| 2009/0265320 | A1* | 10/2009 | Kelley | H04L 12/4641 |
| 2009/0300002 | A1* | 12/2009 | Thomas | G06F 17/30522 |
| 2009/0327255 | A1* | 12/2009 | Larson | G06F 17/30457 |
| 2010/0174754 | A1* | 7/2010 | B'Far | G06F 17/30507 707/794 |
| 2011/0035391 | A1* | 2/2011 | Werner | G06F 17/30731 707/756 |
| 2011/0093469 | A1* | 4/2011 | B'Far | G06N 5/022 707/741 |
| 2011/0106836 | A1* | 5/2011 | Hassanzadeh | G06F 17/30539 707/769 |
| 2011/0320396 | A1* | 12/2011 | Hunt | G06N 5/02 706/47 |
| 2012/0102022 | A1 | 4/2012 | Miranker et al. | |
| 2013/0073571 | A1* | 3/2013 | Coulet | G06F 17/2785 707/755 |
| 2014/0114995 | A1* | 4/2014 | Kelley | H04L 45/38 707/758 |
| 2014/0172780 | A1* | 6/2014 | Senart | G06F 17/30592 707/605 |
| 2014/0172914 | A1* | 6/2014 | Elnikety | G06F 17/30958 707/774 |
| 2014/0229869 | A1* | 8/2014 | Chiantera | G06F 9/451 715/763 |
| 2014/0379755 | A1* | 12/2014 | Kuriakose | G06F 17/3043 707/780 |
| 2015/0269223 | A1* | 9/2015 | Miranker | G06F 17/30932 707/713 |
| 2017/0075904 | A1* | 3/2017 | Hedges | G06F 17/30734 |

FOREIGN PATENT DOCUMENTS

| | | |
|---|---|---|
| CN | 101593103 B | 4/2013 |
| JP | 2001134597 A | 5/2001 |

OTHER PUBLICATIONS

Anudeep Perasani, Distributed RDF Query Processing and Reasoning for Big Data / Linked Data, 2014, all pages. (Year: 2014).*

Udrea et al., GRIN: A Graph Based RDF Index, 2005, all pages. (Year: 2005).*

Kate Byrne, Populating the Semantic Web—Combining Text and Relational Databases as RDF Graphs, 2008, all pages. (Year: 2008).*

Chebotko et al., Semantics preserving SPARQL-to-SQL translation, 2008, all pages. (Year: 2008).*

Luo, Storing and Indexing Massive RDF Data Sets, 2010, all pages. (Year: 2010).*

Bang et al., Storing and Querying RDF in Mars, 2009, all pages. (Year: 2009).*

Miller et al. Three Implementations of SquishQL, a Simple RDF Query Language, 2002, all pages. (Year: 2002).*

Gang Hu, et al.,"Automatically Generating a Sematic Mapping for a Relational Database," U.S. Appl. No. 14/747,092, filed Jun. 23, 2015.

List of IBM Patents or Patent Applications Treated as related; CN920140061US1; Date Filed: May 21, 2015, pp. 1-2.

C. Bizer et al.,"D2R Server-Publishing Relational Databases on the Sematic Web," In 5th International Semantic Web Conference, 2006, pp. 1-2.

C. Bizer, "D2R MAP—A Database to RDF Mapping Language," WWW, ACM, May 22, 2003, pp. 1-2.

C.A.Knoblock et al.,"Semi-Automatically Mapping Structured Sources Into the Sematic Web," Proceedings of the 9th international conference on the Semantic Web: research and applications, 2012, pp. 1-15.

J.Sequeda et al.,"Relational Database to RDF Mapping Patterns," Department of Computer Science, The University of Texas at Austin, OEG-DIA, FI, Universidad Polit'ecnica de Madrid, Spain, Jun. 2011, pp. 1-12.

M. Choi et al.,"The RDFs Mapping for Recursive Relationship of Relational Data Model," Abstract Only, IEEE International Conference on Service-Oriented Computing and Applications (SOCA), Dec. 13-15, 2010, pp. 1-6.

International Search Report and Written Opinion for International Application No. PCT/IB2015/053956; dated Sep. 15, 2015; 6 pgs.

M. Choi et al.,"The RDFs Mapping for Recursive Relationship of Relational Data Model," IEEE International Conference on Service-Oriented Computing and Applications (SOCA), Dec. 13-15, 2010, pp. 1-6.

Japanese Office Action dated May 7, 2019 for Application No. 2016-569064 (3 pages).

Masahide Kanzaki et. al., "Linked Data and Data Mapping", Journal of Japanese Society for Artificial Intelligence, The Japanese Society for Artificail Intelligence, vol. 27(No.8), pp. 163-170.

* cited by examiner

AUTOMATICALLY GENERATING A SEMANTIC MAPPING FOR A RELATIONAL DATABASE

FOREIGN PRIORITY

This application claims priority to Chinese Patent Application No. 201410241219.0, filed May 30, 2014, and all the benefits accruing therefrom under 35 U.S.C. § 119, the contents of which in its entirety are herein incorporated by reference.

BACKGROUND

The present invention relates to data processing, and more particularly, relates to a method and system for automatically generating semantic mapping for a relational database.

Data integration has always been one of the more important tasks in enterprise data management, and the most prevalent one is relational data integration. Classical relational data integration needs to design a global data schema, such that the relational database (RDB) of each locality can be mapped to the global data schema. However, such global data schema can hardly be designed in advance in most cases, particularly when the relational database of each locality has a dynamic addition or deletion. Therefore, the data management community gradually favors the schemaless data integration method, wherein the linked data is greatly valued. The linked data adopts a data model, namely RDF (Resource Description Framework), to represent a data entity using URI (Uniform Resource Identifier), so as to publish instance data and ontology data. Thus, the published data could be obtained through HTTP (HyperText Transfer Protocol), with linkage and contextual information to facilitate human-machine understanding.

The relational data could be published as the linked data through semantic mappings. There are well-known semantic mapping tools such as D2RQ (http://www4.wiwiss.fu-berlin.de/bizer/d2rq/), SquirrelRDF (http://jena.sourceforge.net/SquirrelRDF), and OpenLink Virtuoso (http://virtuoso.openlinksw.com/).

Relational data has a schema, while the schema is composed of tables which are composed of columns. Similarly, the linked data comprises an ontology, while the ontology is composed of classes and properties. Generally, there are two ways to publish relational data as linked data. One is by default. That is, the ontology of such generated linked data is composed of a newly defined class name (i.e., table name in the relational database) and a property name (i.e., the column name in the relational database). The other way is to define a semantic mapping, such that the table names and column names in the relational database can be mapped to the class names and property names that have been defined in the ontology of the linked data. Not surprisingly, the linked data as published by default are always trivial and meaningless. On the contrary, the relational data as published by a well-defined semantic mapping are more useful and meaningful. However, when hundreds of, even thousands of relational databases need to be published as linked data, it is undoubtedly time-consuming and energy-consuming to manually define the D2RQ mappings.

SUMMARY

In one embodiment, a method for automatically generating a semantic mapping for a relational database RDB includes obtaining a first semantic mapping from a first RDB to an ontology of linked data; obtaining a schema mapping from the first RDB to a second RDB; and generating a second semantic mapping from the second RDB to the ontology of the linked data based on the first semantic mapping and the schema mapping.

In another aspect, a system for automatically generating a semantic mapping for a relational database RDB includes a semantic mapping obtaining module configured to obtain a first semantic mapping from a first RDB to an ontology of linked data; a schema mapping obtaining module configured to obtain a schema mapping from the first RDB to a second RDB; and a semantic mapping generating module configured to generate a second semantic mapping from the second RDB to the ontology of the linked data based on the first semantic mapping and the schema mapping.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

In view of the above problems, it is desired to provide a solution for automatically generating a semantic mapping.

According to one aspect of the present invention, there is provided a method for automatically generating a semantic mapping for a relational database RDB. The method includes obtaining a first semantic mapping from a first RDB to an ontology of linked data; obtaining a schema mapping from the first RDB to a second RDB; and generating a second semantic mapping from the second RDB to the ontology of linked data based on the first semantic mapping and the schema mapping.

According to another aspect of the present invention, there is provided a system for automatically generating a semantic mapping for a relational database RDB. The system includes a semantic mapping obtaining module configured to obtain a first semantic mapping from a first RDB to an ontology of linked data; a schema mapping obtaining module configured to obtain a schema mapping from the first RDB to a second RDB; and a semantic mapping generating module configured to generate a second semantic mapping from the second RDB to the ontology of linked data based on the first semantic mapping and the schema mapping.

Through the method and system according to the embodiments of the present invention, the efficiency of generating a semantic mapping from a relational database can be effectively enhanced.

Embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
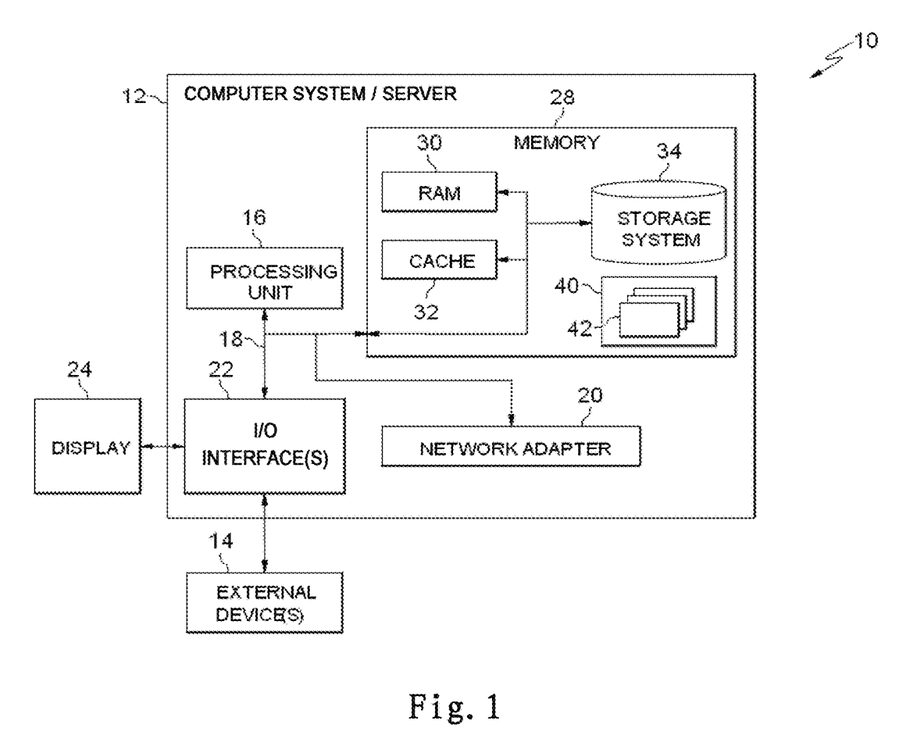
FIG. 1 shows an exemplary computer system/server which is applicable to implement the embodiments of the present invention.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In a relation model of a relational database, both the entities and the relationship between entities have a single structural relationship, i.e., represented by a two-dimensional table. Each table is composed of rows and columns. Each row of the table is a tuple; each column is a property. The value of the property has a corresponding data type and value range. The data model of linked data is a RDF model. The RDF model may be represented by a triple, namely, comprising a subject, a predicative, and an object.

Hereinafter, a method for automatically generating a semantic mapping according to one embodiment of the present invention is described with reference to FIG. 2.

In operation S210, a first semantic mapping from a first RDB to an ontology of linked data is obtained, wherein the semantic mapping may be generated in any known manner. For example, it may be generated through manual definition, or in any other known manner.

In operation S220, a schema mapping from the first RDB to a second RDB is obtained, wherein a schema mapping between relational databases may be implemented using any existing technologies.

In operation S230, a second semantic mapping from the second RDB to the ontology of the linked data is generated based on the first semantic mapping and the schema mapping.

In this way, the semantic mapping between the new relational database and the given ontology of the linked data may be obtained by virtue of a schema mapping between other relational database and this relational database with a defined semantic mapping as a seed, thereby efficiently enhancing the efficiency of generating the semantic mapping.

Figure 2:
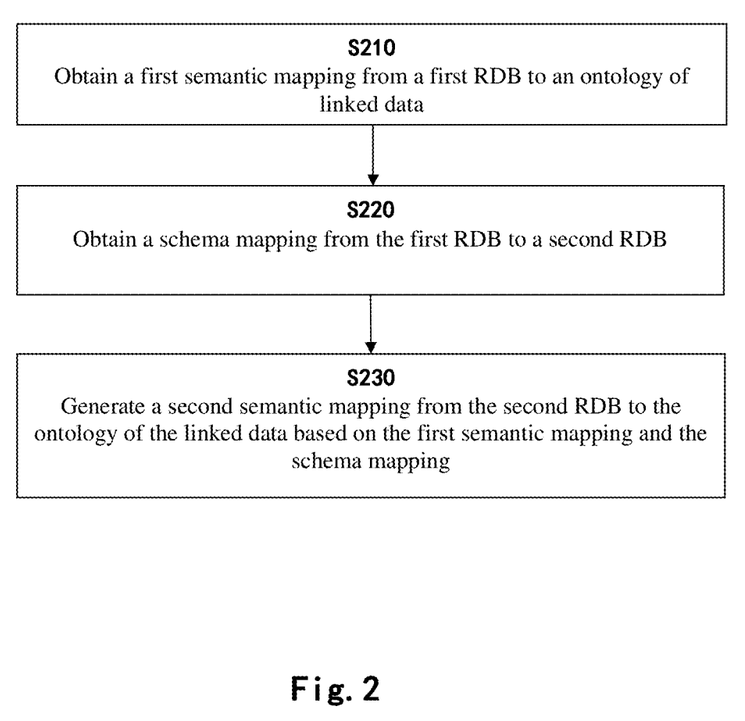
FIG. 2 shows a flow chart of a method for automatically generating a semantic mapping according to one embodiment of the present invention.
Figure 3:
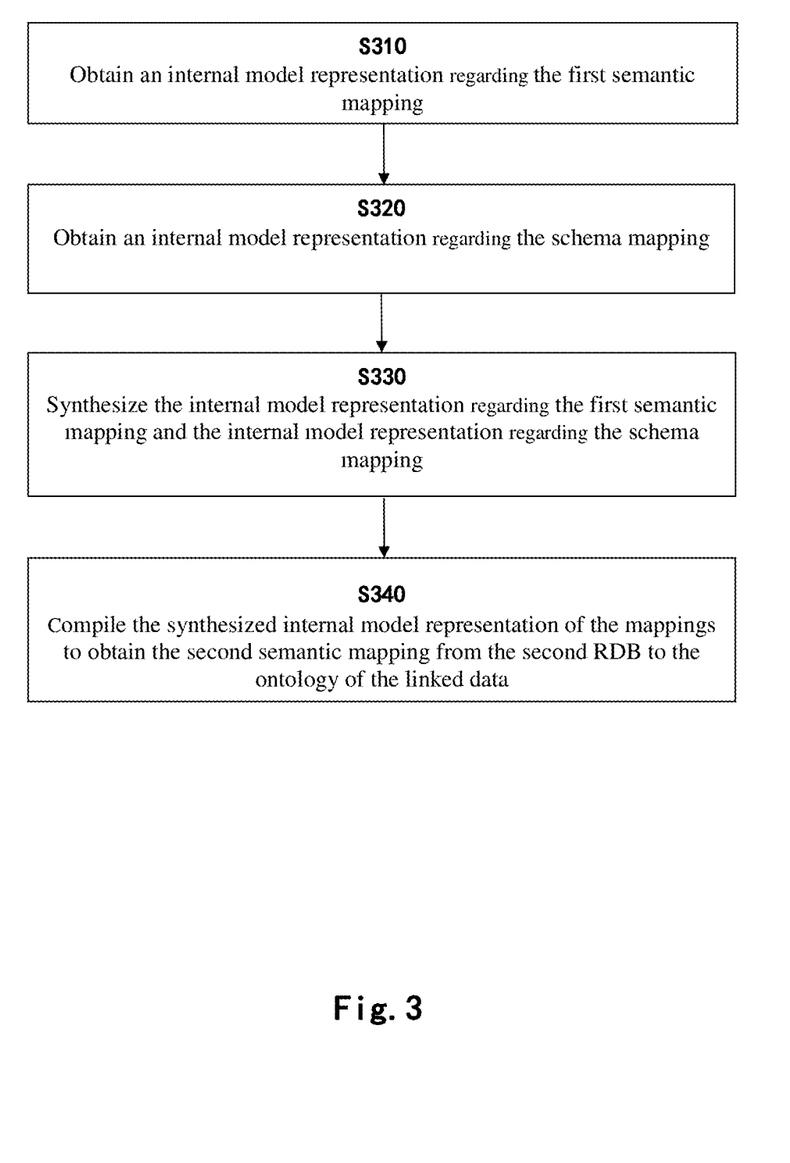
FIG. 3 shows a further flow chart for implementing the operation of FIG. 2 according to one embodiment of the present invention.

FIG. 3 shows a flow chart of one embodiment of the operation S230 shown in FIG. 2.

In operation S310, an internal model representation regarding the first semantic mapping is obtained based on the first semantic mapping from the first RDB to the ontology of the linked data, wherein the internal model representation may employ a logic-based representation, a graphic structure-based representation, or other form of internal model representation. Here, it is not limited to any particular internal model representation; instead, any internal model representation known to those skilled in the art may be adopted.

In operation S320, based on a schema mapping from the first RDB to a second RDB, an internal model representation regarding the schema mapping is obtained. Likewise, this internal model representation may employ a logic-based representation, a graphic structure-based representation, or other form of internal model representation known to those skilled in the art.

In operation S330, the internal model representation regarding the first semantic mapping and the internal model representation regarding the schema mapping are synthesized to obtain a synthetic internal model representation of the mappings. For example, for the logic-based internal model representation, the logic representation of the first semantic mapping and the logic representation of the schema mapping may be logically synthesized by resolution. For the graphic structure-based representation, two graphic structure representations may be composed via the graphic structures to realize synthesis of mappings. According to one embodiment of the present invention, composing of the graphic structures may be performed through graph traversal.

In operation S340, the internal model representation of the synthetic mapping is compiled to obtain a second semantic mapping from the second RDB to the ontology of the linked data. For example, according to one embodiment of the present invention, for the graphic structure-based representation, the synthetic graphic structure representation is compiled through graph traversal.

Those skilled in the art may appreciate that the above method may be implemented by software or by hardware or by combination of software and hardware. Moreover, those skilled in the art would appreciate that by implementing respective operations in the above method in a manner of software, hardware, or a combination of software and hardware, a system for automatically generating a semantic mapping may be provided. Even if the system is identical to a general processing device in hardware structure, due to impact of the software included therein, the system exhibits characteristics distinct from the general processing device, thereby forming an apparatus according to various embodiments of the present invention.

Figure 4:
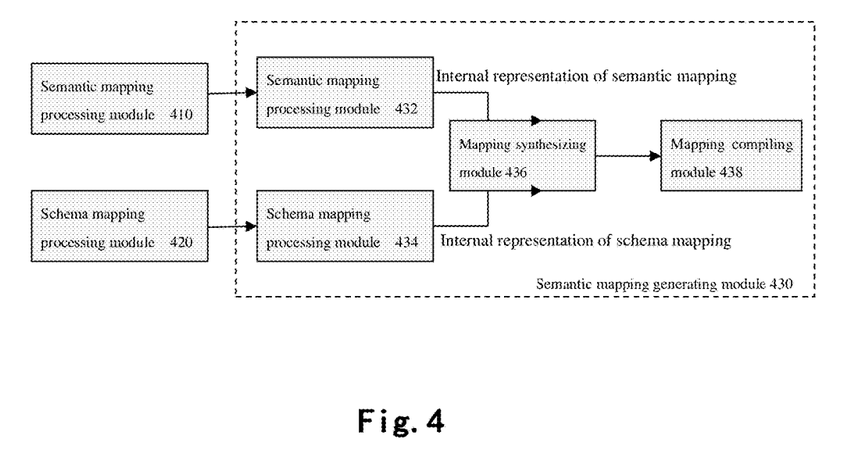
FIG. 4 shows a block diagram of a system for automatically generating a semantic mapping according to one embodiment of the present invention.

FIG. 4 shows a block diagram of a system for automatically generating a semantic mapping according to one embodiment of the present invention. The system comprises: a semantic mapping obtaining module 430 configured to obtain a first semantic mapping from a first RDB to an ontology of linked data; a schema mapping obtaining module 420 configured to obtain a schema mapping from the first RDB to a second RDB; and a semantic mapping generating module 430 configured to generate a second semantic mapping from the second RDB to the ontology of the linked data based on the first semantic mapping and the schema mapping, wherein the semantic mapping obtained by the semantic mapping obtaining module may be generated in any known manner. For example, it may be generated through manual definition, or otherwise in any other known manner. The schema mapping obtained by the schema mapping obtaining module may be a schema mapping between relational databases implemented by any existing technology.

According to one embodiment of the present invention, the semantic mapping generating module 430 may further comprise the following modules: a semantic mapping processing module 432, a schema mapping processing module 434, a mapping synthesizing module 436, and a mapping compiling module 438.

Herein, the semantic mapping processing module 432 is configured to obtain an internal model representation regarding the first semantic mapping based on a first semantic mapping from the first RDB to the ontology of the linked data. The schema mapping processing module 434 is configured to obtain, based on schema mapping from the first RDB to the second RDB, an internal model representation regarding the schema mapping. The mapping synthesizing module 436 is configured to synthesize the internal model representation regarding the first semantic mapping and the internal model representation regarding the schema mapping to obtain a synthetic internal model representation of mappings. The mapping compiling module 438 is configured to compile the synthetic internal model schema of the mappings to obtain a second semantic mapping from the second RDB to the ontology of the linked data.

Hereinafter, with the D2RQ mapping as an example, respective modules according to the embodiments of the present invention are described with reference to a specific example. For the simplicity of depiction, the mapping from a first relational database X to an ontology O of a given linked data is called D2RQ mapping XO, the mapping from the second relational database Y to the first relational database X is called schema mapping YX, and the mapping from the relational database Y to the given ontology O of the linked data is called D2RQ mapping YO.

The semantic mapping processing module obtains an internal model representation of XO based on the received D2RQ mapping XO. The internal model representation may employ a logic-based representation, a graphic structure-based representation, or other form of internal model representation. Here, it is not limited to any particular internal model representation; instead, any internal model representation known to those skilled in the art may be adopted.

Here, an illustration description will be made with the graphic structure-based representation.

According to one embodiment of the present invention, considering that the D2RQ mapping per se may be composed of a RDF triple, namely, <subject, predicative, object>, the subject and object of the RDF triple here are expressed as nodes on the graph, while the predicative of the RDF triple is expressed as an edge on the graph. According to one embodiment of the present invention, if the object of the RDF triple is not a uniform resource identifier, but literal information, then there is correspondingly a blank node on the graph; besides, the blank node will be directed to the relational database node included in the literal information. Here, an edge of such directing is called linkToRDB.

For example, a segment of D2RQ mapping is shown below, wherein each row represents a RDF triple; inter-row indent means sharing the same subject. The first row defines that map:student is a name of D2RQ class mapping. The second row defines that its corresponding ontology class name is onto:Student. The third row defines that its uniform resource identifier refers to the column "name" of the table "student." In particular, the object of the RDF triple is literal information, containing the table name Student and column name name of the relational database.

```
map:student rdf:type d2rq:ClassMap;
    d2rq:class onto:Student;
    d2rq:uriPattern "Student/@ @Student.name@ @";
```

Figure 5A:
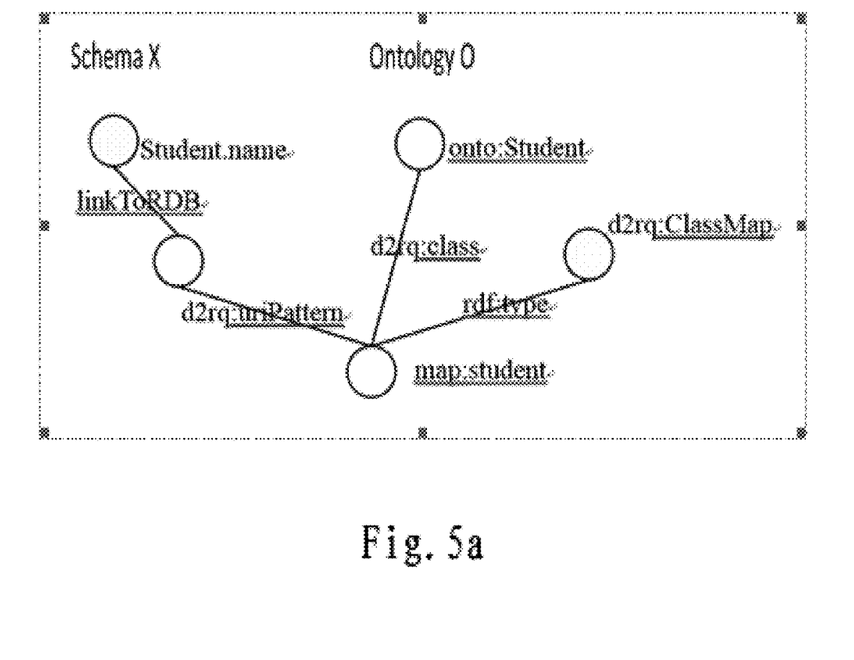
FIGS. 5a, 5b and 5c show a schematic diagram of respective graphic structures according to one embodiment of the present invention, respectively.

Through the semantic mapping processing module, we will obtain the graphic structure representation of the D2RQ mapping, as shown in FIG. 5a. In this figure, the subject map:student of the RDF triple corresponds to the lowest node, while the right edge denotes that the node is directed to the node d2rq:ClassMap through the edge rdf:type, which means this is a D2RQ class mapping. The middle denotes that the node is directed to the class node onto:Student in the ontology O of the linked data through the edge d2rq:class. The left edge denotes that the node is directed to a blank node through the edge d2rq:uriPattern, and then the blank node is directed to the node Student.name of the relational database through the edge linkToRDB.

Although the implementation details of the semantic mapping processing module have been described above through examples, those skilled in the art would understand that these are only for exemplary purposes, and the present invention is not limited to these specific implementations.

The schema mapping processing module obtains the internal model representation of YX based on the received schema mapping YX. Likewise, for the exemplary purposes, the internal model representation of the schema mapping adopts a graphic structure-based representation.

Different from the D2RQ mapping, the schema mapping itself does not have characteristics of a graphic structure. As an example, the following graphic structure-based representation method is proposed here. However, those skilled in the art may understand that it is not limited to the graphic structure-based representation method here; instead, any representation method known to those skilled in the art may be employed.

According to one embodiment of the present invention, each schema mapping name is expressed as a node on the graph, and the "table name.column name" of each relational database is expressed as a node on the graph; moreover, if the "table name.column name 1" and "table name.column name 2" in one schema mapping share a same variable symbol, we introduce an association node, such that the node corresponding to the schema mapping name is directed to the association node through the edge linkToAssociation, and the association node is directed to two nodes corresponding to the "table name.column name 1" and "table name.column name 2," respectively, through the edge linkFromAssociation.

For example, a segment of schema mapping is provided below, wherein M1 denotes the schema mapping name, comprising two table names Undergraduate and Student, and three column names "id1", "id2" and "name". In particular, the column name in the Undergraduate table and the column name in the Student table share the same variable symbol "name", while the column "id1" in the Undergraduate table and the column "name" in the Student table do not share any variable symbol. This means the schema mapping M1 is mapping the column "name" in the Undergraduate table to the column "name" in the Student table, while maintaining the column "id1" in the Undergraduate table and the column "name" in the Student table relatively independent. In other words, M1 maps a name of the undergraduate to a name of the student, but do not assure that the ID of the undergraduate is completely identical to the ID of the student.

Figure 5B:
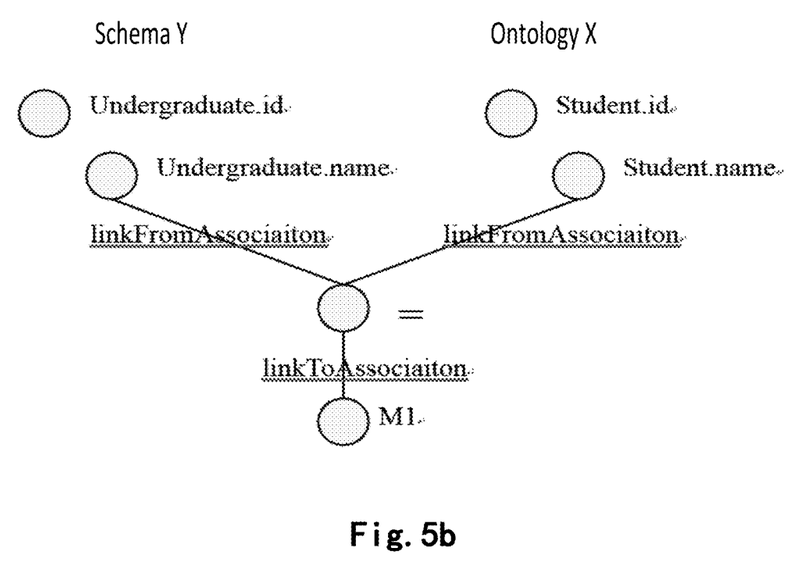

M1: $\forall id1. \forall name. Undergraduate(id1, name) \rightarrow \exists id2. Student(id2, name)$ Through the schema mapping processing module, we will get the graphic structure representation of the above schema mapping M1, as shown in FIG. 5b, wherein the schema mapping name M1 corresponds to the lowest node, which is directed to an association node through the edge linkToAssociation, and then the association node is directed to the left relational database node Undergraduate.name and the right relational database node Student.name, respectively, through the edge linkFromAssociation. Since M1 does not define the mapping relationship between the left relational database node Undergraduate.id and the right relational data node Student.id, the two nodes do not have an inbound edge or an outbound edge.

Although the implementation details of the schema mapping processing module have been illustrated above through examples, those skilled in the art would appreciate that these are only for exemplary purposes, and the present invention is not limited to these specific implementations.

For the D2RQ mapping XO of the internal model representation as obtained from the semantic mapping processing module and the schema mapping YX of the internal model representation obtained from the schema mapping processing module, the mapping synthesizing module performs mapping synthesis of XO and YX. According to one embodiment of the present invention, mapping synthesis may be implemented through a graph traversal-based algorithm. With GXO denoting the graphic structure representation of the D2RQ mapping XO, with GYX denoting the graphic structure representation of the schema mapping YX, and with GYO denoting the graphic structure representation of the D2RQ mapping YO, the algorithm is specified below:

First, staring from d2rq:ClassMap, the GXO graph is traversed. The nodes of the D2RQ class mapping that are reversely directed to through the edge rdf:type are referred to as set NC;

For any node $c \in NC$, the GXO graph is traversed and the blank nodes are directed to through the edge d2rq:uriPattern. Then the nodes of "table name.column name" in the relational database X that are directed to through the edge linkTORDB are referred to as set NX;

For any node $x \in NX$, the GYX graph is traversed and the association nodes are reversely directed through the edge linkFromAssociation. Then, on one hand, the nodes of the schema mapping names that are reversely directed to through the edge linkToAssociation are referred to as set NM; on the other hand, the nodes of "table name.column name" in the relational database Y that are directed to through the edge linkFromAssociation are referred to as set NY;

For any node $m \in NM$, the GYX graph is traversed and the association nodes are reversely directed through the edge linkToAssociation. Then the nodes u and v that are both of "table name.column name" in the relational database Y are directed to through edge linkFromAssociation, and set NE={<u, v>} is defined;

A node w is newly established to direct to the node c of the D2RQ class mapping and the node m of the schema mapping name.

For example, for the following D2RQ mapping and the schema mapping:

```
map:student rdf:type d2rq:ClassMap;
    d2rq:class onto:Student;
    d2rq:uriPattern "Student/@ @Student.name@ @";.
M1: ∀id1. ∀name. Undergraduate(id1, name) → ∃id2. Student(id2, name)
M2: ∀id1. ∀name. Graduate(id1, name) → ∃id2. Student(id2, name)
```

Figure 5C:
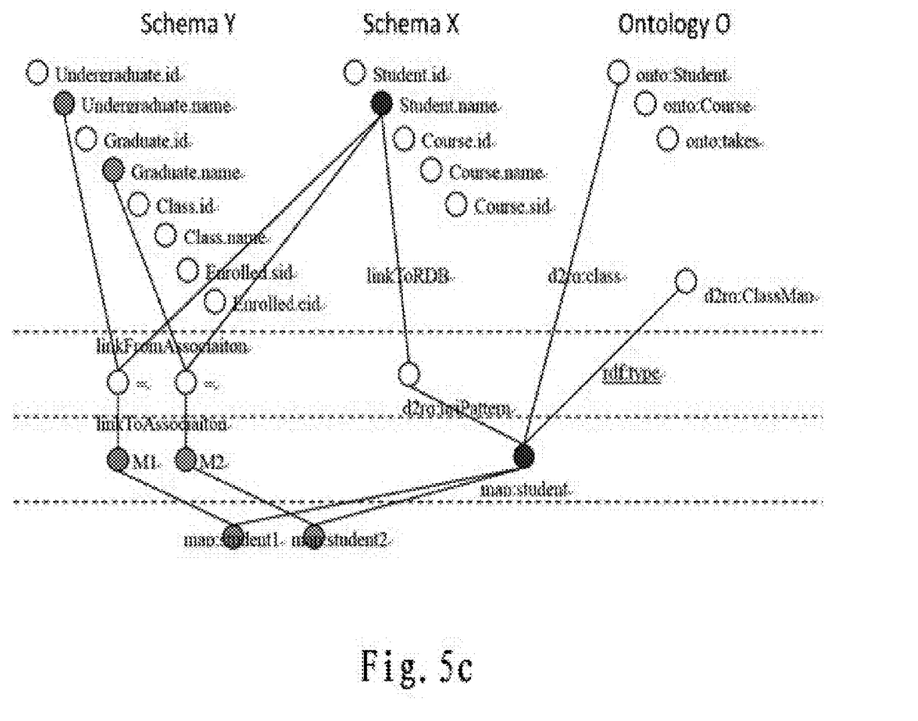

As shown in FIG. 5c, the right side is the graphic structure representation of the D2RQ mapping map:student, while the left side is the graphic structure representations of the schema mappings M1 and M2. Starting from the d2rq:ClassMap, traversing the right graph, reversely directed to the node map:student of D2RQ class mapping through the edge rdf:type, and then directed to the blank nodes through the edge d2rq:uriPatten, and then directed to the node Student.name in the relational database X through the edge linkToRDB. Next, traversing the left graph, reversely directed to two association nodes through the edge linkFromAssociation, and then, in one aspect, reversely directed to the nodes M1 and M2 of the schema mapping name through the edge linkToAssociation; on the other hand, directed to the nodes Undergraduate.name and Graduate.name in the relational database Y through the edge linkFromAssociation, respectively. Besides, starting from M1 and M2, traversing the left graph, directed to the association node through the edge linkToAssociation, and then through the edge linkFromAssociation, no nodes directed to "table name.column name" in the relational database Y are found. Therefore, the newly established nodes map:student 1 and map:student 2 are directed to the node map:student of the D2RQ class mapping and the nodes M1 and M2 of the schema mapping name, respectively.

Although the implementation details of the mapping synthetic module have been illustrated above through examples, those skilled in the art would appreciate that these are only for exemplary purposes, and the present invention is not limited to these specific implementations.

The mapping compiling module complies the synthesized result by the mapping synthesizing module to obtain a corresponding D2RQ mapping YO. Hereinafter, an embodiment of a mapping compiling module implemented through graph traversal will be described with reference to an example.

Starting from the newly established node w, to find the node c of the D2RQ class mapping and the node m of the schema mapping name to which it is directed;

Starting from the node c of the D2QR class, to find the class name cn corresponding to the ontology O of the association data, obtaining the RDF triple w d2rq:class cn;

Starting from the node m of the schema mapping name, to find the node y∈ NY through the edge linkToAssociation and then through the edge linkFromAssociation, obtaining the RDF triple w d2rq:uriPattern "@@y@ @";

Starting from the node m of the schema mapping name, if the corresponding set NE is non-empty, for nodes u and v of "table name.column name" in each pair of relational databases, wherein <u, v>∈ NE, obtaining the RDF triple w d2rq:join "u=v".

For example, for the graphic structure representation synthesized from the above mappings as shown in FIG. 5c, starting from the newly established node map:student 1, to find the node map:student of the D2RQ class mapping and the node M1 of the schema mapping name to which it is directed. Starting from map:student, finding the class name onto:Student corresponding to the association data ontology O through the edge d2rq:class. Starting from M1, finding the node Undergraduate.name∈ NY through the edge linkToAssociation and then through the edge linkFromAssociation. Besides, starting from M1, it is found that the corresponding set NE is an empty set, i.e., the corresponding d2rq:join condition will not be needed. Finally, derive the following D2RQ mapping.

```
map:student1 rdf:type d2rq:ClassMap;
    d2rq:class onto:Student;
    d2rq:uriPattern "Student/@ @Undergraduate.name@ @";.
```

Similarly, starting from the newly established node map:student 2, to find the node map:student of the D2RQ class mapping and the node M2 of the schema mapping name to which it is directed. Starting from map:student, to find the class name onto:Student corresponding to the linked data ontology O through the edge d2rq:class. Starting from M2, find the node Graduate.name∈ NY through the edge linkToAssociation and then the edge linkFromAssociation. Besides, starting from M2, it is found that the corresponding set NE is an empty set, i.e., the corresponding d2rq:join condition will not be needed. Finally, the following D2RQ mapping is derived.

```
map:student2 rdf:type d2rq:ClassMap;
    d2rq:class onto:Student;
    d2rq:uriPattern "Student/@ @Graduate.name@ @";
```

Although the implementation details of the mapping compiling module have been illustrated above through examples, those skilled in the art would appreciate that these are only for exemplary purposes, and the present invention is not limited to these specific implementations.

Moreover, although the description above takes the implementation of various modules as examples, those skilled in the art would appreciate that the above implementations are likewise suitable for corresponding operations in the method for automatically generating a semantic mapping according to the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for automatically generating a semantic mapping for a relational database (RDB), comprising:
   a processor configured to execute a plurality of modules comprising:
   a semantic mapping obtaining module configured to obtain a first semantic mapping from a first RDB to an ontology of linked data;
   a schema mapping obtaining module configured to obtain a schema mapping from the first RDB to a second RDB;
   a semantic mapping generating module configured to generate a second semantic mapping from the second RDB to the ontology of the linked data based on the first semantic mapping and the schema mapping, the semantic mapping generating module comprising:
   a semantic mapping processing module configured to obtain an internal model representation regarding the first semantic mapping based on the first semantic mapping, wherein the internal model representation is a graph, wherein the first semantic mapping is composed of a resource description framework (RDF) triple, wherein the RDF triple comprises a subject, a predicative, and an object, wherein the obtaining the internal model representation regarding the first semantic mapping based on the first semantic mapping comprises expressing the subject and object of the RDF triple as nodes on the graph and expressing the predicative of the RDF triple as an edge on the graph, and wherein the object is expressed as a blank node in the graph responsive to the object being literal information;

a schema mapping processing module configured to obtain an internal model representation regarding the schema mapping based on the schema mapping;

a mapping synthesizing module configured to synthesize the internal model representation regarding the first semantic mapping and the internal model representation regarding the schema mapping to obtain a synthesized internal model representation of mappings, wherein the first semantic mapping and the schema mapping are synthesized by graph traversal; and a mapping compiling module configured to compile the synthesized internal model representation of the mappings to obtain the second semantic mapping;

wherein the first semantic mapping causes the processor to access data in the first RDB and the second RDB with enhanced efficiency and the mapping compiling module is configured to perform graph traversal on the synthesized graphic structure representation of mappings to obtain the second semantic mapping.

2. The system of claim 1, wherein the schema mapping processing module is configured to:

express a schema mapping name in the schema mapping as a node on the graph;

express a table-name.column-name of the first RDB and a table-name.column-name of the second RDB as nodes on the graph;

in response to the table-name.column-name of the first RDB and the table-name.column-name of the second RDB in the schema mapping sharing a same variable symbol, direct a node corresponding to the schema mapping name to an association node through an edge, wherein the association node is directed to nodes corresponding to the table-name.column-name of the first RDB and the table-name.column-name of the second RDB, respectively.

3. The system of claim 1, wherein the mapping synthesizing module is configured to: perform graph traversal on the internal model representation regarding the first semantic mapping and the graphic structure representation regarding the schema mapping, to obtain a synthesized internal model representation of mappings.

\* \* \* \* \*